(12) United States Patent
Thiel et al.

(10) Patent No.: US 7,170,445 B2
(45) Date of Patent: Jan. 30, 2007

(54) POSITIONING SYSTEM

(75) Inventors: Andreas Thiel, Zurich (CH); Heinz Mathis, Uerikon (CH); Etienne Favey, Niederglatt (CH)

(73) Assignee: U-Blox AG, Thalwil (CH)

( * ) Notice: Subject to any disclaimer, the term of this patent is extended or adjusted under 35 U.S.C. 154(b) by 0 days.

(21) Appl. No.: 11/128,226

(22) Filed: May 13, 2005

(65) Prior Publication Data

US 2006/0250303 A1 Nov. 9, 2006

(30) Foreign Application Priority Data

May 3, 2005 (EP) ................... 05405330

(51) Int. Cl.
*G01S 1/00* (2006.01)

(52) U.S. Cl. ............... 342/357.06; 342/357.09

(58) Field of Classification Search ........... 342/357.01, 342/357.02, 357.06, 357.09; 701/213, 215
See application file for complete search history.

(56) References Cited

U.S. PATENT DOCUMENTS

| | | | |
|---|---|---|---|
| 3,750,175 A * | 7/1973 | Lockerd et al. ............. | 342/371 |
| 5,438,337 A | 8/1995 | Aguado et al. | |
| 5,512,902 A | 4/1996 | Guthrie et al. | |
| 5,729,235 A | 3/1998 | Guthrie et al. | |
| 5,812,086 A | 9/1998 | Bertiger et al. | |
| 5,815,114 A | 9/1998 | Speasl et al. | |
| 5,959,575 A | 9/1999 | Abbott et al. | |
| 5,982,322 A * | 11/1999 | Bickley et al. ......... | 342/357.08 |
| 6,147,644 A * | 11/2000 | Castles et al. ............. | 342/367 |
| 6,259,400 B1 | 7/2001 | Higgins et al. | |
| 6,317,079 B1 * | 11/2001 | Shannon ................. | 342/357.09 |
| 6,882,314 B2 | 4/2005 | Zimmerman et al. | |
| 2003/0174090 A1* | 9/2003 | Spilker et al. ............... | 342/386 |
| 2004/0021603 A1* | 2/2004 | Zimmerman et al. ....... | 342/450 |
| 2004/0165657 A1 | 8/2004 | Simic et al. | |
| 2005/0242994 A1* | 11/2005 | Cobb et al. ................. | 342/386 |
| 2006/0022873 A1* | 2/2006 | Zimmerman ................. | 342/464 |

OTHER PUBLICATIONS

G-I.Jee et al., "Indoor Positioning Using TDOA Measurements from Switching GPS Repeater," ION GNSS 2004, p. 1970-1976.
J. Caratori et al., "UPGRADE RnS Indoor Positioning Systems in an Office Building," ION GNSS 2004, p. 1959-1969.

* cited by examiner

*Primary Examiner*—Dao Phan
(74) *Attorney, Agent, or Firm*—Oliff & Berridge PLC

(57) ABSTRACT

For allowing positioning of a GPS receiver within a building, GPS primary positioning signals received by an outdoor receive antenna are up-converted to different carrier frequencies in the 2.4 GHz ISM band and the converted signals are transmitted each by a transmit antenna inside the building, the transmit antennas serving at the same time as access points of a WLAN which is used for transmitting additional positioning data like the positions of the transmit antennas and the signal delay times associated with them. By cycling through the secondary positioning signals received from the transmit antennas, i.e., down-converting each of them during an assigned time slot, and determining clock bias differences in the receiver, the position of the latter is determined using TDOA algorithms.

16 Claims, 2 Drawing Sheets

POSITIONING SYSTEM

FIELD OF THE INVENTION

The invention concerns a positioning system where a receiver uses signals emitted by satellites, pseudolites and similar in order to determine its position. Well-known systems of this type are the GPS system and the GLONASS system.

PRIOR ART

Often the position of a receiver must be determined in places where the sources of primary positioning signals as emitted by, in particular, satellites are obscured from view and, as a consequence, the signals are extremely weak or virtually non-existent, e.g., in woods, buildings, mines etc. Several methods have been developed to allow positioning under such circumstances. In known systems of the generic type (see G. -I. Jee et al., 'Indoor Positioning using TDOA Measurements from Switching GPS Repeater', ION GNSS 2004, pp. 1970–1976 or J. Caratori et al., 'UPGRADE RnS Indoor Positioning System in an Office Building', ION GNSS 2004, pp. 1959–1969) several secondary positioning signals are produced and each of them transmitted by a respective transmit antenna. In each case the secondary positioning signal corresponds to the input signal, restricted to a certain time slot specifically assigned to the signal in question.

In this system time slots must be assigned centrally and the receiver or receivers must be synchronized to the transitions between subsequent secondary positioning signals. The system is relatively complicated and requires expensive hardware. As the input signal is repeated by the transmit antennas essentially unchanged, disturbance of nearby outdoor receivers or indoor receivers capable of processing weak primary positioning signals cannot be excluded.

SUMMARY OF THE INVENTION

It is an object of the invention to provide a system of the generic type which is simple and, in particular, does not require central administration of the transmit antennas or synchronisation of the receiver.

It is a further object of the invention to provide a system which does not produce signals which might interfere with the primary positioning signals emitted by satellites, pseudolites or similar.

The system according to the invention can easily be realised in such a way that no license for its use is required in that only signals whose spectrum is contained in an ISM band, in particular the 2.4 GHz ISM band, are used.

BRIEF DESCRIPTION OF THE DRAWINGS

In the following the invention is described in more detail with reference to drawings showing an embodiment of the invention where.

DESCRIPTION OF THE PREFERRED EMBODIMENTS

Figure 1:
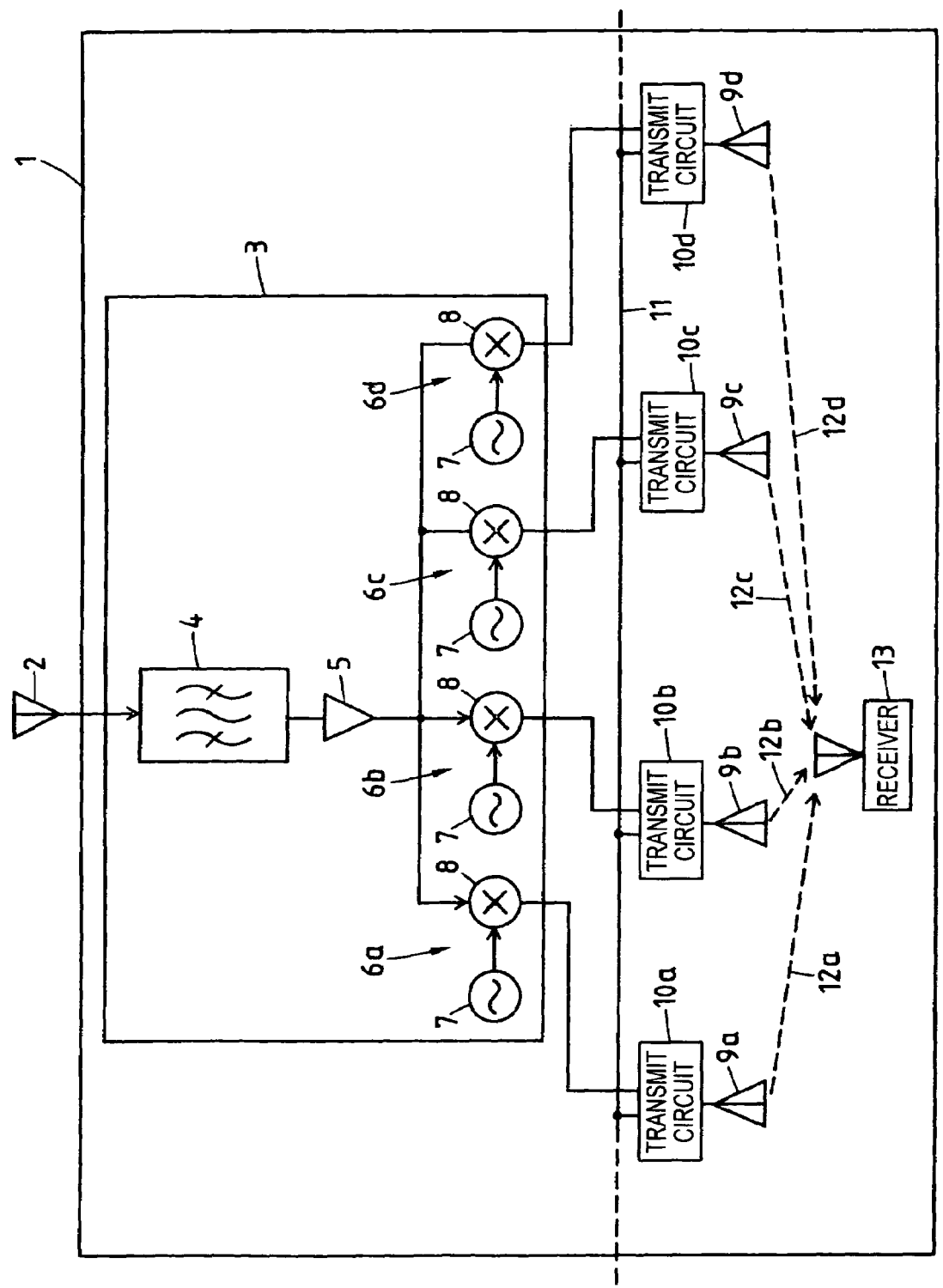
FIG. 1 shows schematically a positioning system according to the invention.

On the roof of a building 1 a receive antenna 2 for receiving primary positioning signals which usually stem from GPS satellites but may in part come from pseudolites and similar devices as well, is mounted. It is connected by an RF cable to a repeater 3 which comprises a bandpass filter 4 and a low noise amplifier 5 whose output is connected to four parallel conversion circuits 6a–d. Each of the conversion circuits 6a–d comprises an oscillator 7 for producing a sine-shaped conversion signal with a specific fixed frequency and a mixer 8 for mixing the same with the output signal of low noise amplifier 5.

The outputs of conversion circuits 6a–d are each connected by an RF cable to one of transmit antennas 9a;b;c;d which are mounted at fixed locations inside building 1, via one of transmit circuits 10a;b;c;d. Each of the latter contains an interface connecting it to a LAN cable 11 and is capable of converting data received via the same into 802.11 WLAN format and vice versa for data transmitted in the opposite direction so each of the transmit antennas 9a–d serves at the same time as a WLAN access point.

Figure 2:
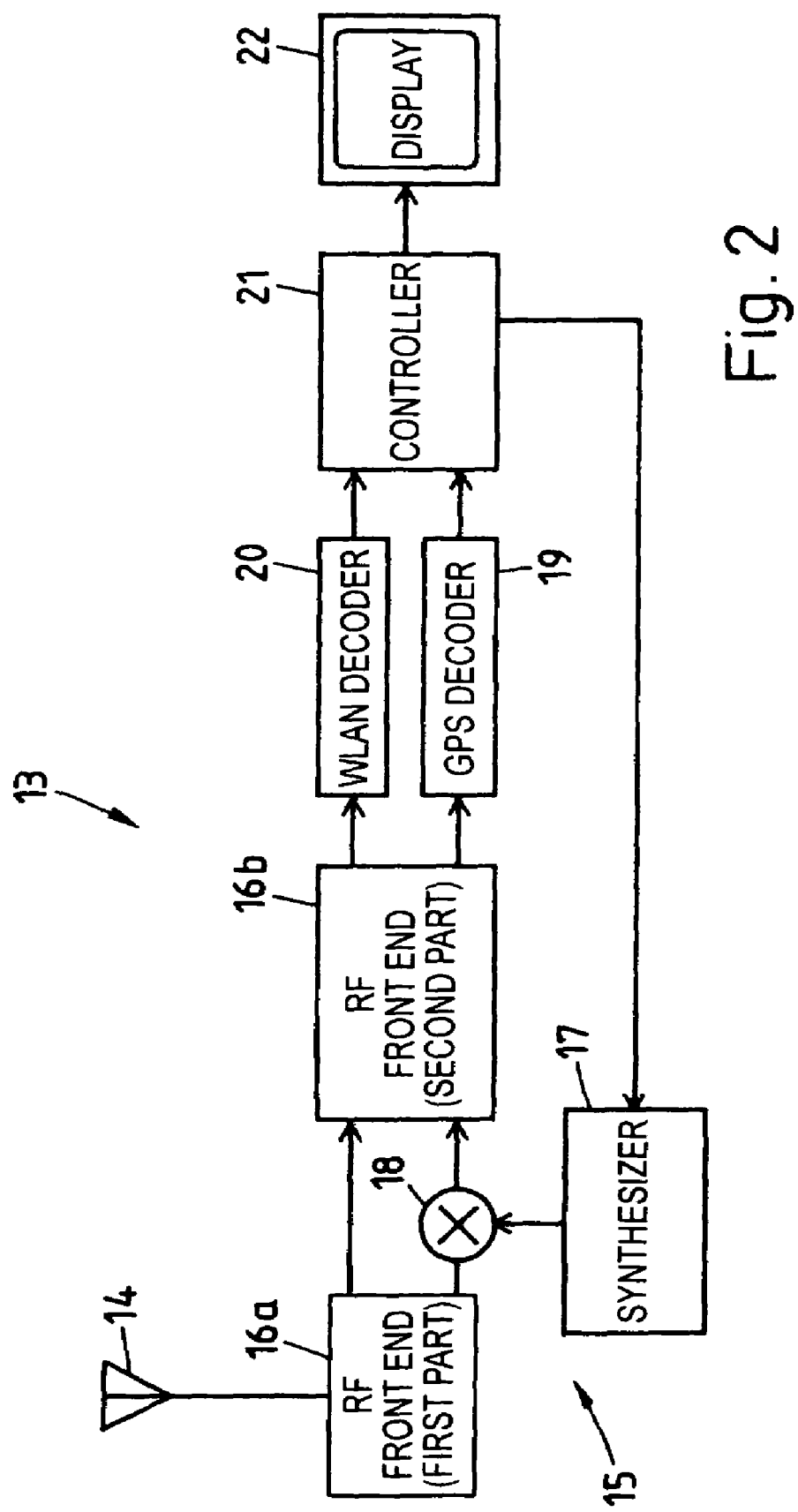
FIG. 2 shows in some more detail, but still schematically, the receiver of the system shown in FIG. 1.

Combined signals 12a–d which contain secondary positioning signal as well as WLAN components are transmitted by transmit antennas 9a–d and received by a receiver 13. The latter comprises (s. FIG. 2) a receiver antenna 14 which is connected to an RF front end for preprocessing received RF signals, the RF front end comprising a first part 16a containing a low noise amplifer and a second part 16b. A back-conversion circuit 15 comprises a synthesizer 17 for producing a sine-shaped back-conversion signal and a mixer 18 between the first part 16a and the second part 16b of the RF front end for mixing the same with the signal from receiver antenna 14. The preprocessed and back-converted signal from receiver antenna 14 is fed to a GPS decoder 19 and the merely preprocessed but not back-converted signal to a WLAN decoder 20.

The outputs of both the GPS decoder 19 and the WLAN decoder 20 are delivered to a controller 21 which extracts data defining the position of receiver 13 from them and controls a display 22 in order to make them accessible to a user. Controller 21 also controls synthesizer 17 in such a manner that the back-conversion signal assumes the frequencies of the conversion signals produced by the oscillators 7 in conversion circuits 6a–d in a cyclical sequence, each of them during a fixed time slot of, e.g., between 0.3 sec and 0.5 sec. For normal, in particular, outdoor use of receiver 13, controller 21 can inactivate the synthesizer 17.

Receive antenna 2 receives primary positioning signals from a number of satellites and possibly pseudolites or similar. This input signal whose carrier frequency is close to the 1.572 GHz GPS frequency is filtered in bandpass filter 4 and amplified by low noise amplifier 5. Then the carrier frequency is up-converted by conversion circuits 6a–d and shifted to four different frequencies in the 2.4 GHz ISM band while the signals are not modified otherwise such that they—apart from their being filtered and amplified—essentially conform to the input signal as received by receive antenna 2. Each of those secondary positioning signals is then furnished to one of transmit circuits 10a;b;c;d where a WLAN signal is superposed and the combined signal 12a;b;c;d output via the respective transmit antenna 9a;b;c;d. The WLAN signal is in 802.11 format with a carrier frequency also in the 2.4 GHz ISM band and contains data like the positions of the transmit antennas 9a–d and the signal time delays associated with each of them. The spectra of the secondary positioning signals as well as of the WLAN signals are contained in the 2.4 GHz ISM band and therefore far removed from the spectrum of the primary positioning signals. There is practically no risk of interference.

In the receiver 13, the superposition of combined signals 12a–d is received by receiver antenna 14, amplified in the first part 16a of the RF front end, then down-converted and its carrier frequencies shifted back to the original values close to 1.572 GHz and the resulting signal, after having been further preprocessed in the second part 16b of the RF front end, fed to GPS decoder 19 where it is filtered and analysed. At the same time, the unconverted signal goes, also via RF front end 16a,b, to WLAN decoder 20 where the relevant data, in particular the positions of transmit antennas 9a–d and the signal time delays associated with them are extracted and delivered to controller 21.

The back-conversion of the combined signals 12a–d is carried out by mixing the signal received by receiver antenna 14 with the back-conversion signal from synthesizer 17 which corresponds to each of the conversion signals produced by the oscillators of the conversion circuits 6a;b; c;d during its assigned time slot. As a consequence, during its respective time slot, the carrier frequency of the GPS component of, e.g., combined signal 12a as transmitted via transmit antenna 9a which conforms to the input signal of receive antenna 2 is converted back and assumes its original carrier frequency.

The back-converted GPS component of combined signal 12a is then isolated and analysed in GPS decoder 19 while the GPS components of the combined signals 12b;c;d from transmit antennas 9b;c;d are suppressed. The analysis yields position data—those of receive antenna 2—as well as a clock bias which is fed to controller 21. Switching from combined signal 12a to combined signal 12b by appropriately changing the frequency of the output signal of synthesizer 17, controller 21 will cause GPS decoder 19 to then analyse the GPS component of combined signal 12b which will yield the same position data but usually a different clock bias. From the differences in clock bias—corrected for the signal time delays—which are gained from cyclically switching through the combined signals 12a–d as well as the known positions of transmit antennas 9a–d the position of the receiver 13 can then be determined by an algorithm of the type used in conventional TDOA calculations. If the synthesizer 17 is not active, the receiver 13 operates like an ordinary GPS receiver.

The usefulness of the invention is not limited to the above-described application. In particular, it may as well be used in larger mobile objects like ships, trains, aeroplanes etc. where the position of the receive antenna is not fixed.

The invention claimed is:

1. Positioning system using primary positioning signals emitted by at least one of satellites, pseudolites or another signal emitting device, comprising:
   a receive antenna for receiving an input signal containing the primary positioning signals;
   a repeater operatively connected to the receive antenna for processing the input signal in order to produce a plurality of secondary positioning signals, each of the plurality of secondary positioning signals distinguished from the remaining secondary positioning signals by a specific carrier frequency different from carrier frequencies of the primary positioning signals;
   a plurality of transmit antennas with fixed positions relative to the receive antenna and operatively connected to the repeater, each of the transmit antennas transmitting one of the secondary positioning signals; and
   at least one receiver capable of receiving and processing the primary positioning signals in order to determine a position of the receiver from the primary positioning signals and further adapted for receiving and processing the secondary positioning signals in order to determine the position of the receiver from the secondary positioning signals.

2. System according to claim 1, where a frequency spectrum of each of the secondary positioning signals is contained in an ISM band.

3. System according to claim 1, where each of the secondary positioning signals conforms, apart from its carrier frequency, to the input signal received by the receive antenna.

4. System according to claim 3, where the repeater comprises a plurality of conversion circuits, each with at least one oscillator for producing a sine-shaped conversion signal and at least one mixer for mixing a signal derived from the input signal with the conversion signal in order to produce one of the secondary positioning signals.

5. System according to claim 4, where the at least one receiver comprises at least one back-conversion circuit, with a synthesizer for producing a sine-shaped back-conversion signal and at least one mixer for mixing a signal containing one of the secondary positioning signals with the back-conversion signal in order to shift its carrier frequency back to the carrier frequency of the input signal.

6. System according to claim 1, where the secondary positioning signals are each processed during a fixed time slot, following each other cyclically.

7. System according to claim 1, where the at least one receiver determines clock bias differences between several secondary positioning signals and calculates its position from the said clock bias differences and known positions of the respective transmit antennas.

8. System according to claim 1, where at least one of the transmit antennas also transmits positioning data, in particular transmit antenna positions, and the at least one receiver processes the said positioning data, using them for determining its position.

9. System according to claim 8, where the transmit antennas also serve as access points of a WLAN and that positioning data transmittal conforms to the 802.11 protocol.

10. System according to claim 1, where the transmit antennas are positioned inside a large object, in particular at least one of a building, train, ship or other vehicle, and the receive antenna is positioned outdoors, in particular on a roof of the said object.

11. System according to claim 2, where each of the secondary positioning signals conforms, apart from its carrier frequency, to the input signal received by the receive antenna.

12. System according to claim 2, where the secondary positioning signals are each processed during a fixed time slot, following each other cyclically.

13. System according to claim 2, where the at least one receiver determines clock bias differences between several secondary positioning signals and calculates its position from the said clock bias differences and known positions of the respective transmit antennas.

14. System according to claim 2, where at least one of the transmit antennas also transmits positioning data, in particular transmit antenna positions, and the at least one receiver processes the said positioning data, using them for determining its position.

15. System according to claim 2, where the transmit antennas are positioned inside a large object, in particular at least one of a building, train, ship or other vehicle, and the receive antenna is positioned outdoors, in particular on a roof of the said object.

16. System according to claim 2, where the frequency spectrum of each of the secondary positioning signals is in the 2.4 GHz ISM band.

\* \* \* \* \*